Jan. 11, 1927.  V. DELAURIER  1,613,648

LISTER PLOW

Filed April 30, 1926

Inventor

Vetal Delaurier

By Cushman Bryant & Darby
Attorneys

Patented Jan. 11, 1927.

1,613,648

UNITED STATES PATENT OFFICE.

VETAL DELAURIER, OF JORDAN, SOUTH DAKOTA, ASSIGNOR OF ONE-FOURTH TO B. B. BUTTS, OF WINNER, SOUTH DAKOTA.

LISTER PLOW.

Application filed April 30, 1926. Serial No. 105,834.

This invention relates to improvements in plows of the lister type, and more particularly to a lister plow adapted for use in combination with a corn planter.

An object of the invention is to provide a lister plow having, instead of the usual rigid mold board, rotatably mounted discs disposed immediately at the rear of the plow share for shedding and throwing aside the soil.

More particularly, the invention has as an object, the provision of improved means for mounting the discs and for positioning the same in the desired position with respect to the plow share.

A further object of the invention is to provide an improved arrangement of the discs with respect to the plow share and to position the plow share so that it will create a minimum of resistance to the forward movement of the plow and at the same time direct the soil which has been turned up, rearwardly to the discs.

The invention comprises broadly, a beam having the usual standard, and carrying at its forward portion, a plow share of substantially triangular outline with relatively flat forward and lateral marginal portions. The plow share tapers upwardly and centrally at its rear end to provide a shield which covers the space between the two discs which are mounted with their forward edges closely adjacent one another. The discs are rearwardly inclined away from one another.

The mounting for the discs preferably takes the form of an integral substantially U-shaped bracket which straddles the standard and has its lateral portions directed rearwardly. A bolt extends through the bracket and standard, the latter being formed to receive this bolt at a plurality of vertically spaced points to permit vertical adjustment of the bracket. This bracket also carries bearings for the discs, the bearings being adjustable both vertically and horizontally to permit ready positioning of the discs relative to the plow share.

The above and other general features of the invention will become clearer as the description proceeds in connection with a preferred embodiment illustrated in the accompanying drawings, wherein.

Figure 1:
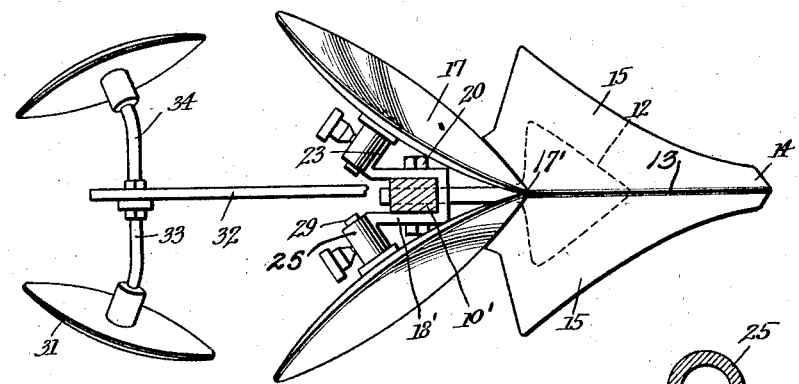
Figure 1 is a top plan view.
Figure 3:
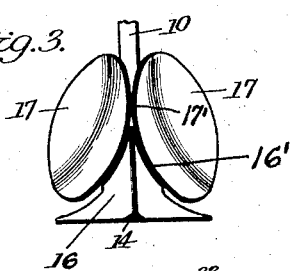
Figure 3 is a fragmentary front elevational view.
Figure 5:
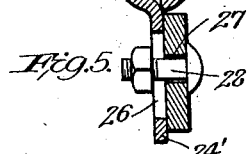
Figure 5 is a vertical section taken through one of the bearing plates carried by the bracket.

Referring to the drawings for a more detailed description, 10 indicates the usual beam which may form a part of any suitable carriage, and has a substantially vertical portion 10' forming a standard. At its lower end the standard has bolted thereto, a forwardly extending arm 11, terminating in a substantially triangular-shaped frog 12, to which is fixedly secured by suitable means (not shown) a combined middle breaker plow share and shield 13. The plow share is preferably of substantially triangular form (Figure 1) having a relatively flat forward portion 14, and also relatively flat lateral marginal portions 15.

Figure 2:
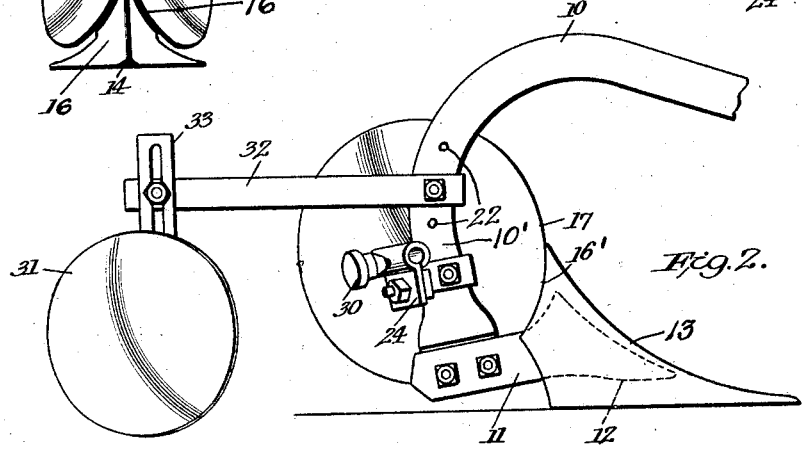
Figure 2 is a side elevational view.
Figure 4:
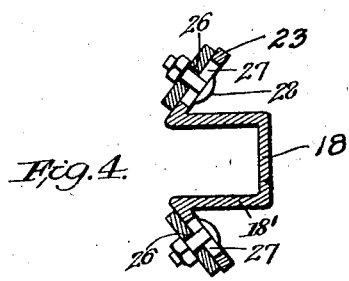
Figure 4 is a horizontal section taken through the supporting bracket for the discs.

At its central portion, adjacent the rear end, the plow share tapers upwardly to a relatively sharp substantially triangular shield portion 16 (Figure 2) which serves to cover the space between the two concave discs 17 below substantially horizontal planes extending through their axes. In other words, it will be observed that the discs are arranged to incline rearwardly away from one another, and have their forward edges at 17' closely adjacent in substantially a horizontal plane extending through their axes. The space below the point 17' is covered by the shield portion 16 of the plow share, which prevents soil thrown up by the plow from passing between the discs into the furrow.

The shield portion 16 has its rear edges 16' curved to conform to the curvature of the discs, and as will be noted, does not extend beyond the edge of the discs, thus permitting the full areas of the discs to operate in shedding the soil. The shield portion 16 is at once distinguishable from such shields as have heretofore been used which overlie lateral portions of the discs adjacent their margins. Shields of this latter type not only create a substantial resistance to forward movement of the plow, but also reduce materially the effectiveness of the discs. By shaping the shield portion of the plow share so that it simply covers the space between the discs, the resistance of the same is reduced to a minimum, and the full effectiveness of the discs is retained.

Referring to the mounting for the discs, they are carried by a substantially U-shaped bracket 18 which is horizontally disposed, and straddles the standard 10' with its side portions 18' extending rearwardly. The bracket may be secured in position on the standard by means of a bolt 20 which is adapted to extend through any one of a series of vertically spaced openings 22 in the standard, these openings permitting vertical adjustment of the bracket to arrange the discs 17 at any desired height with reference to the plow share.

The ends 23 of the bracket portions 18' are bent at an angle to provide lugs to which may be secured bearing plates 24. These plates may be formed from any suitable sheet metal, or otherwise constructed to provide flat shank portions 24' and bearing portions 25. The shank portion has an elongated slot 26 which is preferably disposed at a right angle to a slot 27 in the end 23 of the bracket. A bolt 28 extends through the shank and end 23 of the bracket to clamp the bearing plate in position. It will be understood that the slots 26, 27, permit the bearing plate 24 to be adjusted both vertically and horizontally to vary the relation of the discs with reference to the plow share and also their positions relative to one another.

Each bearing portion 25 receives the fixed axle 29 of a disc 17, and may be lubricated through a suitable grease cup 30. It will be understood that after the bracket has been clamped upon the standard 10' to arrange the discs in approximately the desired relation with respect to the plow share, all minor adjustments may be effected by altering the position of the bearing plates 24 upon the bracket. Thus the discs may be maintained closely adjacent one another at their forward portions, and close against the rear end of the plow share which terminates substantially at the forward edge of the discs.

The plow has associated therewith a pair of discs 31 spaced rearwardly from the discs 17, and slightly lower than the latter for the purpose of covering over seeds which may be deposited in the furrow, either manually or by suitable planting mechanism which will deposit the seeds in the furrow at the rear of the discs 17. The discs 31 will cover over the seeds, due to the fact that they are inclined rearwardly toward one another (Figure 1). These discs may be supported in any suitable manner, as by a rearwardly extending bracket 32 secured to the standard 10', and carrying a vertically adjustable arm 33 which supports an axle 34 upon which the discs are mounted. By means of the arm 33, the discs 31 may be vertically adjusted so as to be properly disposed with reference to the plow share and discs 17.

Obviously, numerous variations may be made in the construction illustrated and described without departing from the invention which is defined in the following claims.

I claim:

1. A plow comprising a beam having a standard, a combined middle breaker plow share and shield secured to said standard, a pair of rotatably mounted discs disposed directly at the rear of the plow share, a support for said discs comprising a substantially U-shaped bracket horizontally disposed around said standard and having its side portions directed rearwardly, the free ends of the side portions carrying bearings for said discs, said plow share having side and rear portions tapering upwardly and curved to form a shield which covers the space between the discs below their adjacent edges whereby the soil thrown out by the plow will be prevented from passing between the discs and plow share into the furrow.

2. A plow comprising a beam having a standard, a combined middle breaker plow share and shield secured to said standard, a pair of rotatably mounted concave discs disposed directly at the rear of the plow share, a support for said discs comprising a substantially U-shaped bracket horizontally disposed around said standard and having its side portions directed rearwardly, the free ends of the side portion carrying bearings for said discs, said plow share having side and rear portions tapering upwardly and curved to form a shield which covers the space between the discs below their adjacent edges whereby the soil thrown out by the plow will be prevented from passing between the discs and plow share into the furrow, the shield portion of the plow being so positioned that the forward edge of each disc forms a continuation of said plow share.

In testimony whereof I have hereunto set my hand.

VETAL DELAURIER.